United States Patent [19]

Baenziger

[11] 4,361,293
[45] * Nov. 30, 1982

[54] FISHING REEL

[76] Inventor: Robert C. Baenziger, 115 Voltz Rd., Northbrook, Ill. 60062

[*] Notice: The portion of the term of this patent subsequent to Aug. 25, 1998, has been disclaimed.

[21] Appl. No.: 136,552

[22] Filed: Apr. 2, 1980

Related U.S. Application Data

[63] Continuation-in-part of Ser. No. 958,038, Nov. 6, 1978, abandoned, which is a continuation-in-part of Ser. No. 56,511, Jul. 11, 1979, abandoned.

[51] Int. Cl.³ ............................................. A01K 89/01
[52] U.S. Cl. ......................... 242/84.2 R; 242/84.2 A
[58] Field of Search ..................... 242/84.2 A, 84.2 R, 242/84.21 R, 84.21 A, 84.2 F

[56] References Cited

U.S. PATENT DOCUMENTS

| | | | |
|---|---|---|---|
| 2,675,193 | 4/1954 | Hull | 242/84.2 E |
| 3,059,873 | 10/1962 | Hull | 242/84.2 A |
| 3,116,894 | 1/1965 | Rule | 242/84.2 A |
| 3,176,930 | 4/1965 | Miller et al. | 242/84.2 A |
| 3,222,010 | 12/1965 | Borgström et al. | 242/84.2 A |
| 3,223,347 | 12/1965 | Clark | 242/84.2 A |
| 3,697,011 | 10/1972 | Christensen et al. | 242/84.2 A |

FOREIGN PATENT DOCUMENTS 1138215  12/1968  United Kingdom ........... 242/84.2 R Primary Examiner—Billy S. Taylor
Attorney, Agent, or Firm—Lockwood, Dewey, Alex & Cummings

[57] ABSTRACT

A fishing reel is disclosed of the type employing a non-rotating line storage spool, wherein line is discharged by unwinding in a generally axial direction from one end of the spool. A freewheeling flywheel is mounted coaxially in front of the spool to engage line during discharge. The freely spinning flywheel provides a feel for direction and distance of the cast, but is of sufficiently small inertia so as not to impair line discharge. The flywheel may be controlled or feathered by tactile contact with a control button coaxially mounted on a common axle with the flywheel, for rotation therewith.

15 Claims, 11 Drawing Figures

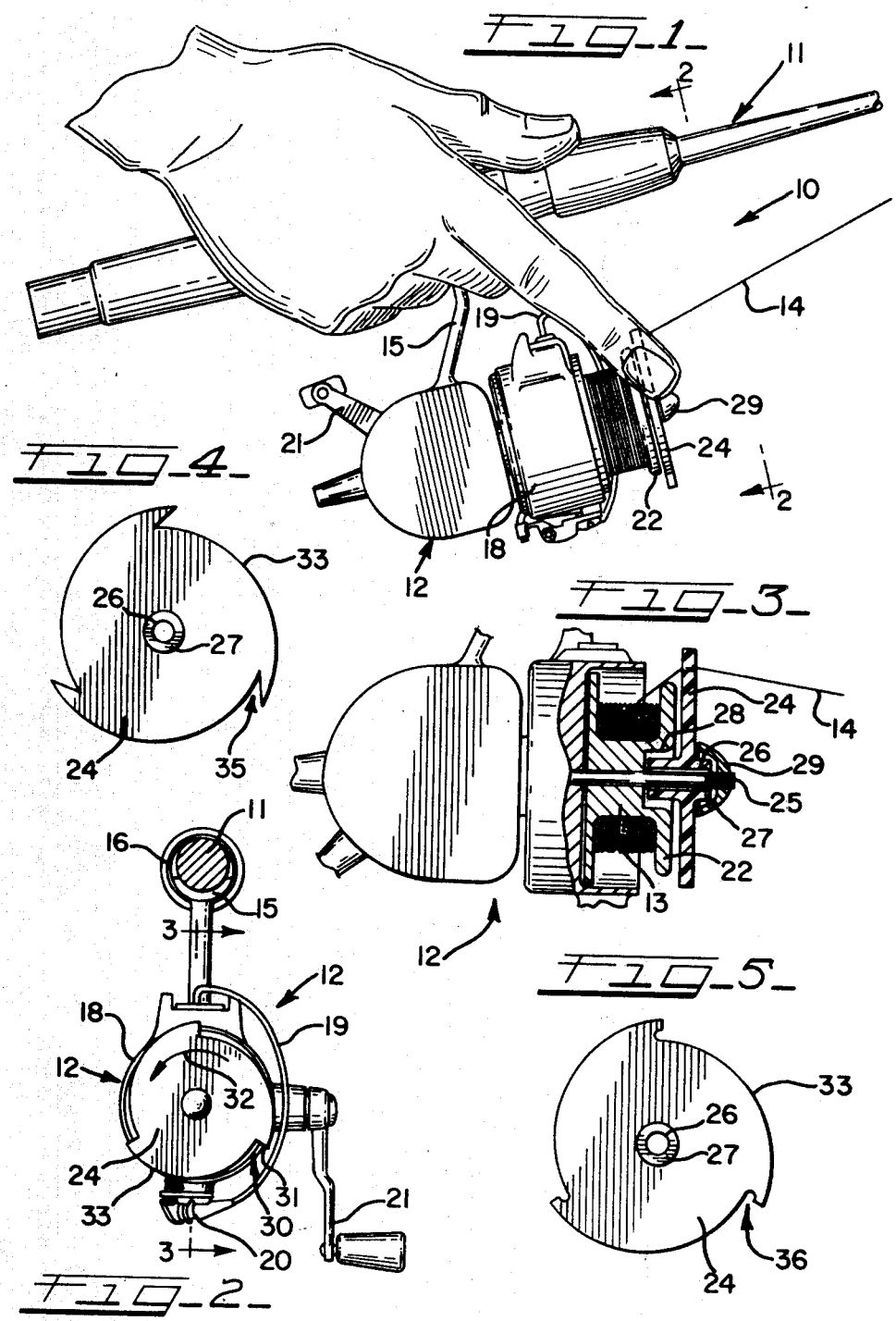

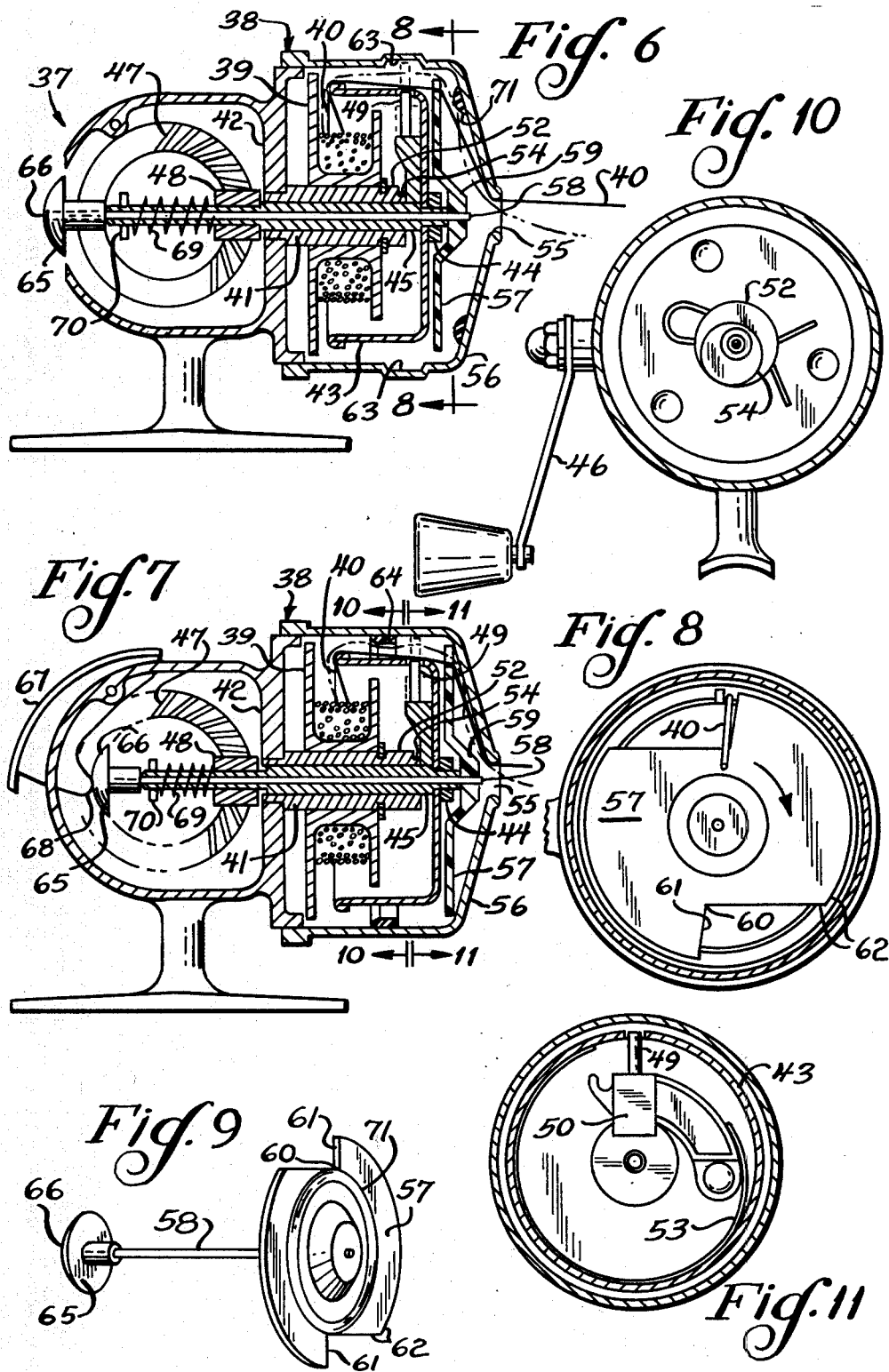

FISHING REEL

This application is a continuation-in-part of copending United States patent application Ser. No. 958,038, filed Nov. 6, 1978, now abandoned and co-pending United States patent application Ser. No. 056,511, filed July 11, 1979, which is a continuation-in-part of co-pending United States patent application Ser. No. 958,038, filed Nov. 6, 1978, now abandoned.

This invention generally relates to apparatus for controlling or feathering the discharge of line from the non-rotating spool of a spinning fishing reel of the type wherein line is permitted to freely discharge, as during casting, by unwinding in a generally axial direction about an open discharge end of the fixed spool.

While spin-casting reels of the fixed-spool type are in widespread use, such reels do not appeal to many experienced fishermen because of the lack of feel between line, rod and reel during casting. This lack of connection or feel is due to the free unwinding of the line about the open-face or discharge end of the non-rotating spool during casting, and results in a lack of control over the distance or direction of the cast after the line is released and begins to freely unwind.

In U.S. Pat. No. 3,516,191, issued on June 23, 1970, entitled "Fishing Reel Wheel", there is disclosed a freewheeling flywheel for attachment to a fishing rig between the reel and the forward end of the rod for the purpose of improving the casting of bait and to give feel to where the bait is going. The flywheel is circumferentially enclosed, with openings for axial passage of the line from the reel to and from the flywheel for tangential winding and unwinding from a circumferential groove defined in the flywheel. While this prior invention satisfactorily performs its desired functions, it has not been an easily marketable item. In particular, since the flywheel is a separate attachment, its sales appeal is limited. Furthermore, the device embodied in that invention needs demonstration to illustrate its function and effectiveness.

U.S. Pat. No. 2,675,193 shows an early attempt to provide line discharge control for a spin-casting reel of the closed-face type, wherein the non-rotating line spool is fully enclosed by the reel housing. In that reel, line is retrieved by a rotating skirt with peripheral line-engaging notches which wind the line onto the fixed spool. During casting, the skirt is disengaged from the reel handle, and unwinding line passing through the notches, causing the skirt to rotate. A control button driven by the skirt is accessible for thumb-contact to control rotation of the skirt and thereby to control line discharge. Casting with this reel, however, is not satisfactory because of the large amount of drag and inertia provided by the rotating skirt and associated line take-up mechanism, which must be heavy and rugged enough to win in large fish and which also carries gears or the like for cooperation with the winding handle.

U.S. Pat. Nos. 3,222,010 and 2,929,578 and United Kingdom Pat. No. 1,138,215 show additional fishing reels. In particular, the United Kingdom patent shows an open-face reel with an independently rotating flange mounted in front of the fixed line storage spool. The disclosed purpose of the flange is to carry the line over the front edge of the spool for greater casting distance. It apparently does not relate to providing a better "feel" for or feathering of the casting line. Whereas, it is a general object of the present invention to provide a spin-casting reel of the type having a non-rotating spool adapted to discharge line therefrom by unwinding in a generally axial direction to the spool about an open discharge end of the spool with an improved line discharge control which permits more precise casting.

Another object of the present invention is to provide such a spin-casting reel which includes a freewheeling flywheel as an integral part of the spinning reel, which flywheel rotates freely with respect to the line take-up or retrieval mechanism.

A further object of the present invention is to provide a manual control for selectively retarding the flywheel rotation to control or feather the discharge of line therefrom.

A still further object of the present invention is to provide a spin-casting reel of the type described wherein the flywheel may be moved to lock the line completely against discharge without damaging the line.

These objects and advantages of the invention, and others, including those inherent in the invention, are accomplished by a low-inertia freewheeling flywheel adapted to be rotatively mounted in a generally coaxial relationship to the non-rotating spool of a spinning fishing reel wherein line discharges as during casting by unwinding in a generally axial direction to the spool about the open discharge end of the spool. The freewheeling flywheel, rotates independently of any line take-up or retrieval mechanism, and preferably is in the form of a disc of generally circular configuration mounted adjacent the discharge end of the spool, on an extension of the spool shaft, or on one end of a central, freely rotating axle or shaft which extends through the spool shaft. Recess means are transversely disposed in the disc at at least one circumferential position in the disc with the recess means adapted to slidably engage the line during discharge from the spool to cause rotation of the disc thereby controlling the discharge of line from the spool. The recess means preferably has an abutting edge in the unwinding direction of line from the spool for engagement of the line with the disc in the unwinding direction, but the periphery of the disc defines a continuous arcuate surface between the adjacent recess means in the winding direction of the line on the spool such that winding of the line need not cause rotation of the disc. The line therefore automatically engages the disc during the unwinding and requires no special threading or hook-up of the line to the disc. Because the flywheel is of very low inertia, it does not impair the discharge of line from the reel. In the closed-face version of the reel, a manually operative control member is also mounted on the reel to control, including precise feathering of, the discharge of line from the reel. The control member is preferably mounted on a common axle with the flywheel and freely rotates therewith. Control is provided by direct manual contact, e.g., thumb pressure, with the spinning control member or indirectly via movable button which engages the control member. The line may also be fully locked against discharge by depression of the control member, which shifts the flywheel forward to either pinch the line against the reel housing or to freeze the flywheel against the housing, which in turn prevents further unwinding of the line. Either embodiment prevents further line discharge without damage to the line itself.

The features of the present invention, which are believed to be novel and patentable, are set forth with particularity in the appended claims. The invention, together with the further advantages thereof can best be understood by reference to the following description taken in conjunction with the accompanying drawings in which like reference numerals identify like elements, and in which:

FIG. 1 is a side elevational view of a fishing rig, including a pole and a spinning reel of the type having a non-rotating spool from which line discharges by freely unwinding over the discharge end of the spool, and further illustrating the freewheeling flywheel of the present invention rotatively mounted adjacent the discharge end of the spool for slidably engaging the line as it passes over the discharge end of the spool, and still further illustrating the fingertip control which may be applied to the freewheeling flywheel to control discharge of the line from the spool;

FIG. 2 is a front elevational view of the fishing rig of FIG. 1 taken in section at line 2—2 for further illustrating the freewheeling flywheel;

FIG. 3 is an enlarged side elevational view of the fishing reel of FIG. 1, with the reel partially broken away to illustrate the internal construction and mounting of the freewheeling flywheel adjacent to the discharge end of the spool;

FIG. 4 is a front elevational view of a modified flywheel wherein the line-engaging recesses are generally V-shaped;

FIG. 5 is a front elevational view of another modified freewheeling flywheel wherein the line engaging recesses are arcuate or semi-circular;

FIG. 6 is a side vertical sectional view of a closed-face type fishing reel embodying the present invention.

FIG. 7 is a side vertical sectional view of an alternative embodiment of a closed-face type fishing reel embodying the present invention.

FIG. 8 is a vertical sectional view taken along line 8—8 of FIG. 6, with the line receiving recesses in the flywheel slightly exaggerated.

FIG. 9 is a perspective view of the flywheel and control member mounted on a common shaft in accordance with one embodiment of the present invention.

FIG. 10 is a vertical sectional view taken along line 10—10 of FIG. 7.

FIG. 11 is a vertical sectional view taken along line 11—11 of FIG. 7.

Referring to FIG. 1, there is shown a fishing rig, generally designated 10, including a pole 11 to which is attached a reel 12, having a non-rotating spool 13 with a supply of line 14 wound thereon for casting or retrieving a fishing lure or bait (not shown) attached to the free end of the line 14.

The reel 12 is secured to the pole 11 by means of a foot 15 extending from the reel 12 and adapted to be secured by rings or couplings 16 on the pole 11 in the customary manner.

Adjacently disposed to the spool 13 is a level wind mechanism including an annular collar 18 of larger diameter than the ends of the spool 13 and semi-circular ring 19 with a line guide 20 near one end thereof. The semi-circular ring 19 is pivotally connected at ends to the collar 18 which, in turn, is operatively connected to a crank handle 21. Operation of the crank handle 21 causes rotative movement of the collar 11 and, hence, the ring 19 and line guide 20 to wind the line 14 on the non-rotating spool 13. Typically, the spool 13 is also operatively connected to the handle 21 such that the spool 13 oscillates axially for a level winding of line thereon.

Line 14 is typically discharged from the spool 13, as during casting of the bait from the pole 11, by pivoting the semi-circular ring 19 to an opposite position from that shown in FIG. 2 such that the line 14 discharges from the reel 12 by freely unwinding in a generally axially direction to the spool about the open-faced discharge end 22 of the spool 13. Upon termination of the cast, operation of the crank handle 21 will cause the semi-circular ring 19 to reassume the position shown in FIG. 2 such that the line guide 20 will again pick up the line 14 for winding the line about the spool 13. This type of fishing reel 12 is generally known to the prior art and is often termed an open-faced spinning reel because winding or discharge of the line takes place over the discharge end of 22 of the spool 13 in generally axial relationship to the spool 13.

In accordance with one aspect of the invention, a low inertia freewheeling flywheel 24 is rotatively mounted on the spool shaft 25 (FIG. 3), such that the flywheel 24 is in substantially coaxial relationship with the spool 13 and is adjacent the open-faced discharge end 22 thereof. Preferably, the flywheel is mounted for rotation with as little friction as possible. As is best shown in FIG. 3, a centrally located aperture or bore 26 extends transversely through the flywheel 24 through the axially elongated hub portions 27 with the hub portions providing better rotational stability characteristics for the flywheel 24. A threaded nut 29 engages the end of the shaft 25 for securement of the flywheel 24 thereon as an integral part of the fishing reel 12. The face of the discharge end 22 of the spool 13 preferably has an annular recess 28 into which that portion of the hub 27 adjacent the spool 13 is freely received so as not to interfere with rotation of the flywheel 24. The bore 26 may serve as the bearing means for the flywheel 24 about the shaft 25 in the manner of a low friction journal bearing. Alternatively, conventional roller or ball bearings may be provided between the flywheel 24 and the shaft 25 for even reduced friction.

The flywheel 24 is preferably in the shape of a disc of generally circular configuration. However, it will be appreciated to those skilled in the art that the advantages of the present invention can be achieved with other shapes or configurations than those illustrated or described herein. The flywheel is preferably of strong but lightweight rigid plastic construction, such as polyethylene, nylon, polyvinylchloride or polytertrfluoroethylene. The lightweight plastic keeps the rotational inertia of the flywheel very low so as not to impart excessive drag when discharging line causes the flywheel to spin.

The flywheel may be constructed in a variety of shapes and sizes, but the main concern, apart from engaging the line in discharge, is keeping the inertia sufficiently low that it doesn't impair discharge of line from the flywheel. Accordingly, it is desirable to keep the mass of the rotating parts and particularly that of the large radius flywheel as small as practical. In a reel of the type shown in FIGS. 6 and 7, the mass of the flywheel should be less than or equal to about 9 grams and is preferably less than or equal to 5 grams. The total mass for the combination of flywheel 24, axle 58 and contact member 65 has been calculated as being less than or equal to about 15 grams and is preferably less than or equal to about 8 grams. Employing flywheels of generally disc shape, and calculating rotational inertia by the formula $I=(MR^2/2)$, where I is the rotational inertia, R is the radius of the disc and M is the mass of the disc, the inertia should be less than or equal to about 30 gm cm² to provide a flywheel which does not unduly impair line discharge, and is preferably less than or equal to about 15 gm cm². This calculation is for the flywheel alone, as the inertia contribution of the axle and contact member are relatively small because of the very small radius of the axle and small mass of the contact member.

In accordance with another aspect of the invention, at least one recess is disposed transversely in the flywheel 24 at a generally circumferential position. FIG. 2 illustrates the preferred embodiment of the invention wherein a plurality of recesses 30 in the flywheel 24 may be characterized as right angle recesses extending transversely across the periphery of the disc 24 such that the recesses 30 each define an upstanding line engaging edge 31, with the edge 31 being a portion of a radius of the disc 24. Upon pivoting of the ring 19 to the casting position to permit the line 14 to freely unwind from the spool 13 in the direction of the arrow 32 in FIG. 2, the line will contact the periphery of the flywheel 24 and will automatically engage against one of the line engaging edges 31 defined by the recess 30. Discharge of the line 14 will thereafter begin to cause rotation of the flywheel 24 in the direction indicated by arrow 32. The line 14 will remain engaged in the recess 30 as long as there is tension in the line and will discharge by slidably moving against and along the edge 31.

Many modifications and variations of the recess 30 will be apparent to those skilled in the art. For example, the flywheel 24 could alternatively be provided with teeth or projections rising from the surface thereof and cause operation of the flywheel 24 in substantially the same manner as presented above. In the preferred embodiment of the invention, transverse recesses 30 are utilized such that the periphery of the flywheel 24 defines a continuous arcuate surface 33 between adjacent recesses 30. The arcuate surface 33 permits winding of the line back onto the spool 13 without causing rotation of the flywheel 24 in a direction reverse to that shown in FIG. 2. The arcuate surfaces 33 also permit the flywheel 24 to continue rotating in the unwinding direction immediately after casting of the bait is finished, as due to rotational inertia, without causing further payout of line 14 from the spool 13. That is, the flywheel 24 engages the line 14 while there is tension in the line due to casting, but upon release in the tension of the line at the end of the case the arcuate surfaces 33 between the adjacent recesses 30 permit continued rotation of the flywheel 24 without affecting payout of line.

In the embodiment illustrated in FIGS. 1–3, the flywheel 24 is preferably of greater dimension than the diameter of the discharge end 22 of the spool 13 or has portions of the periphery of the flywheel 24 extending above the circumference of the discharge end 22 such that the flywheel 24 may be engaged by fingertip contact, as illustrated in FIG. 1, to control the casting response or characteristics of the fishing rig 10. Without the flywheel 24, line 14 begins to freely unwind from the spool 13 and there is very little ability to control or correct the casting of bait or lures. With the flywheel 24, greater casting distances can be obtained especially with the lighter weight baits or lures, such as flies which have a casting trajectory which dies out very quickly due to air drag. Correction of casting of the bait too far can be achieved by gently touching the flywheel 24 immediately after the cast while the flywheel is rotating due to discharge of the line 14.

Variations of the line-receiving recesses in the flywheel 24 are illustrated in FIGS. 4 and 5. V-shaped recesses 35 are transversely disposed about the periphery of the flywheel 24 in FIG. 4 with the v-shape recesses 35 defining an angle of less than 90 degrees for more securely slidably receiving and engaging the line 14 during discharge. Arcuate surfaces 33 continue to be provided between adjacent recesses 35. In the embodiment illustrated in FIG. 5, a plurality of arcuate or semi-circular recesses 36 are transversely provided in the periphery of the flywheel 24. The recesses 36 exhibit less friction when the line 14 slidably discharges therealong. Similar to the previous embodiments, continuous arcuate surfaces 33 are provided between adjacent recesses 36.

The depth and size of the respective recesses 30, 35, 36, has been somewhat exaggerated in the drawings for illustration purposes. It will be readily appreciated that the recesses 30, 35, 36 can be quite small in size. Typically, the recesses 30, 35, 36 need only be slightly larger than the diameter of the line 14.

FIGS. 6 through 11 relate to an alternative embodiment of the present inventor, as it is used in a closed-face type spin-casting reel. In FIG. 6, the reel 37 has a housing, generally at 38, enclosing a non-rotating spool 39 about which fishing line 40, e.g., monofilament is wound.

The spool 39 is axially mounted on a non-rotating shaft 41 which extends forward from an internal rigid wall 42. Line is wound onto the spool by a line take-up mechanism which includes a rotating cup-shaped line retrieval skirt 43 coaxially mounted over the forward flange of the spool 39. The retrieval skirt 43 is mounted by retaining nut 44 on a line retrieval shaft 45 which extends coaxially through the fixed shaft 41 and moves axially and rotates freely with respect to the fixed shaft. The retrieval skirt is rotated by turning crank handle 46 which, via meshing gears 47 and 48, turns the line retrieval shaft 45.

Looking briefly at FIG. 11, the line take-up mechanism also employs a cam-actuated line-engaging pin 49 mounted on the inside surface of the retrieval skirt. The pin 49 is driven by a spring loaded cam follower 50 adapted to engage a cam surface 52 (FIGS. 10 and 6) on the end of the fixed shaft 41. The pin 49 is retracted for casting by moving the retriveal shaft axially forward so that the cam follower 50 is moved forward off the cam surface 52. When disengaged from the cam surface 52, the cam follower 50 and the pin 49 snap inwardly to a retracted position by action of leaf spring 53. Line is retrieved by rotating crank handle 46 which causes the cam follower to move up stepping cam surface 54 to rest on cam 52 and restores the pin 49 to the non-retracted position through an aperture in the skirt 43 such that the pin will pick up the line 40 and begin winding of the line over the skirt 43 onto the spool 39. When the pin 49 is retracted, the line 40 can freely unwind from the spool 39, pass over the skirt 43 and discharge through an aperture 55 in the apex of cone-shaped front housing portion 56. Although not shown in the illustrated embodiment, the reel may also include a level wind mechanism which causes the skirt or spool to oscillate axially as line is wound onto the spool, thus resulting in more even distribution of the line on the spool.

In another type of reel, not shown here, but illustrated in U.S. Pat. No. 2,675,193, the line take-up mechanism does not use a retractable pin, but employs notches on the rearward edge of the skirt flange which engage the line for winding into the spool.

In accordance with the present invention, a low inertia freewheeling flywheel 57 is rotatably mounted adjacent the skirt 43 in a coaxial position with respect to both the skirt and the spool 39. The flywheel is mounted at one end of a small central axle or shaft 58 which extends coaxially through the line retrieval shaft 45 and rotates freely with respect to the shaft 45.

As with the earlier described embodiment, the flywheel 57 is preferably in the shape of a disc of generally circular configuration and may have a central recessed hub portion 59 for close-fitting adjacent the face of the skirt 43, which helps prevent line from entangling therebetween. However, it will be appreciated to those skilled in the art that the advantages of the present invention can be achieved with other shapes or configurations than those illustrated or described herein. At least one recess 60 is disposed transversely in the flywheel 57 at a generally circumferential position. FIGS. 8 and 9 illustrate the preferred embodiment of the invention wherein a plurality of slightly exaggerated recesses 60 in the flywheel 57 may be characterized as right angle recesses extending transversely across the periphery of the disc 57 such that the recesses 60 each define an upstanding line-engaging edge 61 along a radius of the disc 57. Upon casting, the line 40 freely unwinds from the spool 39 in the direction of the arrow in FIG. 8, the line will contact the periphery of the flywheel 57 and will automatically engage against one of the line-engaging edges 61 defined by the recesses 60. Discharge of the line 40 will thereafter begin to cause rotation of the flywheel 57 in the direction indicated by arrow, and the line 40 will remain engaged in the recess 60 as long as there is tension in the line and will discharge by slidably moving against and along the edge. The same modifications may be made in this flywheel as in that discussed earlier.

In the preferred embodiment of the invention, transverse recesses 60 are utilized such that the periphery of the flywheel 57 defines a continuous arcuate surface 62 between adjacent recesses 60. The arcuate surface 62 permits winding of the line back onto the spool 39 without necessarily causing rotation of the flywheel 57 in a direction reverse to that shown in FIG. 8. The arcuate surfaces 62 also permit the flywheel 57 to continue rotating in the unwinding direction immediately after casting of the bait is finished, as due to rotational inertia, although the inertia is very low, without causing further payout of line 40 from the spool 39. That is, the flywheel 57 engages the line 40 while there is tension in the line due to casting, but upon release in the tension of the line at the end of the cast the arcuate surfaces 62 between the adjacent recesses 60 permit continued rotation of the flywheel 57 without affecting payout of line.

For positive engagement between the line 40 and the recesses 60, the diameter of the flywheel 57 is preferably larger than the line retrieval skirt 43. Because the line must pass through the central aperture 55 in the conical housing portion 56, the radially inward tension on the line during casting draws the line against the edge of the flywheel and into one of the peripheral recesses 60. However, when the flywheel 57 is of larger diameter than the line retrieval skirt 43, the line 40 may have a tendency to slip over the pick-up pin 49 during retrieval.

To prevent this, and to provide a more positive line pick-up, referring to FIG. 6, an annular groove 63 may be provided in the housing 38, and the pick-up pin 49 lengthened to extend into the groove 63 during line retrieval. The inside surface of the housing keeps the line 40 below the end of the pin 49 and therefore assures more positive line pick-up. An alternative construction shown in FIG. 7 employs an annular ring 64 mounted on the inside surface of the housing behind the pick-up pin 49 to hold the line below the end of pin 49 for more positive pick-up.

The flywheel 57 of the present invention can be fabricated from a wide variety of materials including metals and plastics by known manufacturing techniques. The diameter, thickness, and weight of the flywheel will be dependent upon a number of factors such as the diameter of the discharge end of the spool 39 and the internal geometry of the front housing portion 56. However, as noted earlier, the mass of the flywheel is preferably kept very small to reduce the inertia of the flywheel and the friction forces arising when it rotates. In contrast to earlier reels, this prevents the flywheel from creating too much drag on the discharge of line from the reel, while simultaneously permitting increased "feel" for accurate casting of even light baits or lines. Accordingly, the flywheel is preferably made of lightweight plastic such as PVC, nylon, polyethylene or similar material such as aluminum. The flywheel for the closed-face reel preferably is within the dimensional and inertia ranges set forth above.

To control the rotation of flywheel 57 and thus the discharge of line 40 from the spool 39, touch control means are provided which allow the fisherman to selectively retard or brake the rotation of the flywheel by manual pressure. In accordance with this aspect of the present invention, a contact member 65 is attached to the rearward end of the axle 58 upon which the flywheel 57 is mounted. As best seen in FIG. 9, the contact member is preferably of circular disc shape with a hemispherical contact surface 66. Because the contact member 65 is mounted on the same axle as the flywheel, it rotates with the flywheel, and because it is relatively small and very light, does not add substantial inertia to the flywheel.

Rotation of the flywheel 57 is retarded by applying friction to the contact member 65. This may be accomplished by providing an access opening on the rear portion of the reel housing 18 for direct manual contact, such as by the fisherman's thumb, as shown in FIGS. 6 and 2. Also, as illustrated in FIG. 7, a separate control button 67 may be pivotally mounted on the housing, with an arcuate contact surface 68 which may be moved into contact with the hemispherical surface 66 of the contact member 65. The greater pressure applied to the contact member 65, the greater the frictional force and the more the rotation of the flywheel and the line discharge is retarded. This permits a delicate "feathering" action by the fisherman to place the bait more accurately during casting.

During the cast, line discharge on the back swing of the pole is prevented by depressing the contact member 65, which pushes the flywheel 57 against the inside surface of the conical housing 56. This either pinches the line 40 between the flywheel 57 and housing 56 or freezes the edge of the flywheel against housing so that the fishing line is trapped within one of the recesses 60. Forward movement of the contact member 65, which abuts the line retrieval shaft 45, also serves to shift the line retrieval shaft 45 and skirt 43 axially forward. This results in the cam follower 50, which is mounted inside the skirt, being moved off the cam surface 52 so that the spring 53 causes the cam follower 50 to snap inwardly, retracting the line retrieval pin 49. The flywheel 57, retrieval shaft 45 and contact member 65 are normally spring biased to a rearward line-release position, so that when the contact member is released, the flywheel and housing move sufficiently far apart for line discharge therebetween. To achieve this, a biasing spring 69 extends axially over the line retrieval shaft 47 and is compressively positioned between line take-up gear 48, which is itself axially slidable over the shaft 47, and a retaining ring 70 fixed to shaft 47.

To prevent damage to the line 40 by the pinching action of the flywheel 57 against the conical housing portion 56, a resilient O-ring 71 may be mounted on either the inside surface of the conical face as shown in FIG. 6, or on the flywheel itself, as shown in FIG. 9. This permits pinching of the line without cutting or abraiding. If an O-ring is employed, it is preferably mounted on the housing to keep flywheel inertia minimal.

An alternative for locking the line 40 against discharge, preferable to an O-ring, is shown in FIG. 7. If the flywheel 57 is of sufficiently large diameter, axial depression of the contact member causes the peripheral edge of the flywheel to tightly engage the inside surface of the conical housing portion 56. This freezes the flywheel against further rotation, and the line 40, which is engaged in one of the recesses 60 against further unwinding. Because the line is not actually pinched or crimped, no damage occurs.

Summarizing the operation of a reel embodying the present invention, prior to casting, the line 40 has been retrieved and the bait or line is just beyond the end of the pole. The fisherman depresses the contact member 65 or control button 67, which causes axial movement of the flywheel 57, either alone or in combination with the line retrieval skirt 43, to a forward position which locks the line against discharge either by pinching the line against resilient O-ring 71 or freezing the peripheral edge of the flywheel against the inside surface of the housing. As the pole is moved through the casting stroke, the control member or push button is released and line is permitted to unwind axially from the spool. During this time, the line pick-up pin 49 is in the retracted position because the forward movement of the skirt 43 has dislodged the cam follower 50 from the cam surface 52. The discharging line passes over the edge of the skirt through the center aperture 55 in the conical housing portion 56. The freewheeling flywheel 57 is positioned between the skirt 48 and the conical housing portion 56, and as the line unwinds, it engages edge 61 of one of the flywheel recesses 60, causing the flywheel to spin as the line discharges. The rotating flywheel alone provides a sufficient mechanical connection between the line and reel to give the fisherman a better "sense" or "feel" for where the bait is going, thus permitting more accurate casting. However, because of the very low inertia, it does not impair discharge of the line or shorten the length of the cast.

To further control bait placement, e.g., when a cast is too long, line discharge may be retarded by slight pressure against the contact member 65, either directly or by the control button 67 which frictionally engages the contact member, to slow rotation of the flywheel 57, permitting a precise feathering and control of the line discharge.

The present invention has been described in terms of the preferred embodiment for the purpose of illustration, not limitation, and it will be understood that various changes and modifications may be made without departing from the spirit of the invention as defined in the following claims.

I claim:

1. In a fishing reel of the type having a housing enclosing a non-rotating spool, said spool being adapted to discharge line therefrom through an aperture in said housing by unwinding of the line in a generally axial direction from one end of the spool and line take-up means rotatably mounted between the discharge end of said spool and said aperture for winding line onto the spool, said line take-up means including a generally radially-extending line engaging pin, the improvement in said fishing reel comprising:

flywheel means within said housing and means mounting said flywheel means between said line take-up means and said aperture, said flywheel means being mounted in a generally coaxial and freely rotating relationship with respect to said spool and said line take-up means, said flywheel means including line engaging means to engage the line during discharge from said spool to cause rotation of said flywheel means as line discharges from said spool, said reel further comprising annular means interior of said housing cooperative with said line-engaging pin to retain line in contact with said pin during line take-up.

2. A fishing reel in accordance with claim 1 wherein said housing has an annular groove and said pin extends into said groove.

3. A fishing reel in accordance with claim 1 wherein said annular retaining means comprises a ring carried on the inside surface of said housing adjacent said pin.

4. In a fishing reel of the type including a non-rotating spool adapted to discharge line therefrom by unwinding line in a generally axial direction from one end of said spool, and line take-up means engageable with the line and rotatable around said spool for winding line onto said spool, the improvement comprising, in combination;

an axle member and means supporting said axle member in a generally co-axial relationship with respect to said spool and freely rotatable with respect to said spool and said line take-up means;

line engaging means rotatably mounted on said axle member adjacent said discharge end of said spool, said line engaging means having a rotational moment of inertia about its axis of rotation less than or equal to about 30.0 grams cm$^2$ and including at least one distinct line engaging portion engageable with the line during discharge from said spool to cause rotation of said line engaging means and said axle member;

touch control means mounted on said axle member beyond the other end of said spool for rotation with said axle member and said line engaging means during line discharge and operable upon frictional engagement to retard selectively rotation of said line engaging means to control the discharge of line from said spool.

5. A fishing reel in accordance with claim 4 wherein said rotational inertia is less that or equal to 15 grams cm$^2$.

6. In a fishing reel of the type having a non-rotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a rotational moment of inertia about its axis of rotation less than or equal to about 30.0 grams cm$^2$;

touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, and wherein said touch control means is operable to move said flywheel means between a retracted position spaced from said housing to permit discharge of the line and a forward position to engage said housing to freeze said flywheel means against rotation.

7. In a fishing reel of the type having a non-rotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a rotational moment of inertia about its axis of rotation less than or equal to about 30.0 grams cm$^2$;

touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, wherein said touch control means is operable to move said flywheel means between a forward position against said housing to prevent discharge of line and a retracted position spaced from said housing to allow discharge of the line and wherein one of said flywheel and said housing includes a resilient pinch ring for pinching the line to prevent discharge.

8. In a fishing reel of the type having a non-rotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a rotational moment of inertia about its axis of rotation less than or equal to about 30.0 grams cm$^2$;

touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, wherein said touch control means is operable to move said flywheel means between a forward position against said housing to prevent discharge of line and a retracted position spaced from said housing to allow discharge of the line;

said line take-up means comprising a generally radially extending line engaging pin and said reel further comprising annular means interior of said housing to retain line in contact with said pin during line take-up.

9. A fishing reel in accordance with claim 8 wherein said annular retaining means comprises an annular groove on the inside of said housing and said pin extends into said groove.

10. A fishing reel in accordance with claim 8 wherein said annular retaining means comprises a ring carried on the inside surface of said housing adjacent said pin.

11. In a fishing reel having a nonrotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a mass less than or equal to about 9 grams;

touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, and wherein said touch control means is operable to move said flywheel means between a retracted position spaced from said housing to permit discharge of the line and a forward position to engage said housing to freeze said flywheel means against rotation.

12. In a fishing reel of the type having a non-rotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a mass less than or equal to about 9 grams;

touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, wherein said touch control means is operable to move said flywheel means between a forward position against said housing to prevent discharge of line and a retracted position spaced from said housing to allow discharge of the line and wherein one of said flywheel and said housing includes a resilient pinch ring for pinching the line to prevent discharge.

13. In a fishing reel of the type having a non-rotating spool adapted to discharge line therefrom by unwinding of the line in a generally axial direction from one end of the spool and line take-up means for winding line onto the spool, the improvement in said spinning reel comprising:

flywheel means and means rotatably mounting said flywheel means adjacent the discharge end of said spool and in a generally co-axial relationship therewith, said flywheel means including line engaging means to engage the line during discharge from said spool to cause rotation of said flywheel means as line discharges from said spool, said flywheel means being freely rotatable with respect to said line take-up means and having a mass less than or equal to about 9 grams; touch control means associated with said flywheel means and operative by manual pressure to retard rotation of said flywheel means selectively to control the discharge of line from said spool;

a housing for surrounding said spool and said flywheel means, an aperture in said housing for discharge of line therethrough from said spool after engagement by said flywheel means, wherein said touch control means is operable to move said flywheel means between a forward position against said housing to prevent discharge of line and a retracted position spaced from said housing to allow discharge of the line;

said line take-up means comprising a generally radially extending line engaging pin and said reel further comprising annular means interior of said housing to retain line in contact with said pin during line take-up.

14. A fishing reel in accordance with claim 13 wherein said annular retaining means comprises an annular groove on the inside of said housing and said pin extends into said groove.

15. A fishing reel in accordance with claim 13 wherein said annular retaining means comprises a ring carried on the inside surface of said housing adjacent said pin.

* * * * *

UNITED STATES PATENT AND TRADEMARK OFFICE
CERTIFICATE OF CORRECTION

PATENT NO. : 4,361,293

DATED : November 30, 1982

INVENTOR(S) : Robert C. Baenziger

It is certified that error appears in the above-identified patent and that said Letters Patent are hereby corrected as shown below:

```
On the cover page under U.S. Patent documents,
    Pat. No. 3,116,894 - delete "1/1965" and
    insert --1/1964--.

Col. 1, line 57 - delete "win" and insert --wind--.

Col. 4, line 67 - delete "I=(MR²/2)" and insert
    --I=MR²/2--.

Col. 6, line 6 - delete "v-shape" and insert --V-shape--.

Col. 6, line 25 - delete "inventor" and insert
    --invention--.

Col. 6, line 49 - delete "retriveal" and insert
    --retrieval--.

Col. 10, line 67 - delete "that" and insert -- than --.
```

Signed and Sealed this

Third Day of January 1984

[SEAL]

Attest:

GERALD J. MOSSINGHOFF

*Attesting Officer*  *Commissioner of Patents and Trademarks*